United States Patent [19]

Lyman, Jr. et al.

[11] 4,006,375
[45] Feb. 1, 1977

[54] STEPPING MOTOR

[75] Inventors: Frank Lyman, Jr., Cambridge; William C. McDonald, Belmont, both of Mass.

[73] Assignee: Cambridge Thermionic Corporation, Cambridge, Mass.

[22] Filed: May 2, 1975

[21] Appl. No.: 573,922

Related U.S. Application Data

[63] Continuation of Ser. No. 442,686, Feb. 14, 1974, abandoned.

[52] U.S. Cl. .............................. 310/49 R; 310/268
[51] Int. Cl.² ........................................ H02K 37/00
[58] Field of Search ............ 310/49, 268, 162–164, 310/254, 258, 156, 259; 318/138, 598

[56] References Cited

UNITED STATES PATENTS

| | | | |
|---|---|---|---|
| 3,239,702 | 3/1966 | Van De Graaff | 310/268 |
| 3,372,291 | 3/1968 | Lytle | 310/49 |
| 3,392,293 | 7/1968 | De Boo | 310/49 |
| 3,466,479 | 9/1969 | Jarret | 310/268 |
| 3,469,123 | 9/1969 | Inaba | 310/268 |
| 3,745,388 | 7/1973 | Frederick | 310/49 |
| 3,757,147 | 9/1973 | Lyman | 310/49 |
| 3,774,059 | 11/1973 | Cox | 310/49 |
| 3,784,850 | 1/1974 | Inaba | 310/49 |
| 3,803,431 | 4/1974 | Inaba | 310/49 |

Primary Examiner—R. Skudy
Attorney, Agent, or Firm—Robert F. O'Connell

[57] ABSTRACT

A rotary stepping motor having high torque and low rotor inertia wherein the rotor is of a disk type configuration having a plurality of uniformly spaced rotor poles and the stator has a plurality of stator pole pairs which are formed in separate groups, the spacing between the stator poles in each group being equal to the rotor pole spacings and the spacings between the stator pole groups being not equal to the rotor pole spacings. The stator may be formed of laminated stator elements to provide a magnetic path with the laminations oriented so as to prevent delamination thereof due to the magnetic forces present during operation. The laminated stator elements are appropriately affixed to the motor housing so that the pole pieces thereof are maintained at preselected positions relative to a reference planar surface of the housing. The rotor poles may be tapered to further reduce the rotor inertia and increase motor speed operation.

21 Claims, 18 Drawing Figures $$5(A-1) + 4(B \mp \tfrac{1}{5}) + (C \mp \tfrac{1}{5}) = R$$

STEPPING MOTOR

This is a continuation of application Ser. No. 442,686 filed on Feb. 14, 1974.

INTRODUCTION

This invention relates generally to rotary stepping motors and more particularly to multi-phase rotary stepping motors utilizing a single rotor and stator combination.

BACKGROUND OF THE INVENTION

Stepping motors which rotate a shaft through a predetermined angle upon the application of a pulse or pulses of current find use in many fields where positive, accurate, discrete movements reliably responsive to relatively high frequency pulses are desired. The pulse instructions are converted directly to accurate mechanical motions by the stepping motor and, in general, in order to provide high-speed and accurate positioning, it is desirable that such motors be capable of developing high mechanical power and be able to start from rest and operate at relatively high pulse frequencies. Accordingly, such motors should be designed to develop high torques to produce such high power and to provide rotors having low inertias to produce high acceleration operation. Moreover, such motor should have efficient magnetic path characteristics so that energy losses, particularly due to eddy current losses, be held to a minimum. Further, such motors should be relatively easy to fabricate at costs competitive with stepping motors presently available.

DISCUSSION OF THE PRIOR ART

One prior art stepping motor which eliminates mounting and inertia problems has been described in U.S. Pat. No. 3,757,147, issued on Sept. 4, 1973, to Frank Lyman, Jr. Such motor utilizes a shaft having a plurality of disk-like rotors distributed axially thereon and a housing which carries corresponding axially distributed stators, the rotors and stators having their respective pole-forming elements separated by axial air gaps. The use of a plurality of axially stacked rotor-stator combinations tends to give rise to difficult manufacturing problems since the machining tolerances on the rotor and stator parts produce cumulative error effects which can only be reduced with great care and at high cost. Such factors make it difficult to produce such motors on a production basis on a competitive level. Moreover, such motors tend to produce relatively low torques, which may not make them practical for many applications.

An alternative type of prior art stepping motor, often referred to as a "single-stack" motor, has recently been discussed in the published "Symposium Proceedings on Incremental Motion Control Systems and Devices," published by the Department of Electrical Engineering at the University of Illinois, Urbana-Champaign, Illinois, March 27–31, 1972. Such motors use a single rotor and stator combination, the number of teeth, or pole faces, on the rotor and the number of teeth, or pole faces, on the stator being different. For example, a single stack, three-phase motor with twelve stator teeth and eight rotor teeth provides 24 steps per shaft revolution, each step angle being 15°. The above-referenced symposium proceedings discuss a large number of different rotor and stator teeth combinations for providing from 12 to 200 steps per revolution and in all cases the rotor and stator teeth are always symmetrically arranged with equal spacing between the teeth on each.

The stepping motors shown therein utilize cylindrical rotors as opposed to the disk-type rotors described in the above-referenced Lyman patent. In addition to the high inertias which are present in cylindrical rotors, the use of a different number of teeth on the stator from the number of teeth on the rotor causes the spacings between the rotor teeth to be different from the spacings between the stator teeth, a situation which tends to produce undesired torque cancellations at each step position so that the effective overall torque is reduced.

Further, if an attempt is made to construct such motors in a disk-type configuration for a relatively large number of steps, the number of teeth on the stator becomes sufficiently great that little space is left to permit the placement of the coil windings thereon and construction of the coil configuration becomes increasingly difficult if not substantially impossible.

SUMMARY OF THE INVENTION

This invention utilizes a disk-type, single-stack rotor-stator combination which can provide relatively high torques with low rotor inertia, which structure overcomes coil placement problems which arise in constructing motors having a high number of steps. In accordance therewith, the disk-type rotor used therein has a plurality of equally spaced pole pieces which extend radially from the hub thereof. The stator uses a plurality of separate groups of pairs of stator pole pieces, the number of such groups being selected to equal the number of excitation phases which are used, each group having a separate excitation coil associated therewith. The spacing of the pole piece pairs on the stator are such that the pole pieces in each of said groups are equally spaced from each other, such spacing being equal to the spacing of the rotor pole pieces. Each group, however, is separated from its adjacent group by a spacing which is not equal to rotor pole spacing and which, depending on the embodiment selected, can be either less than, or greater than, the spacing of the rotor pole pieces.

By using a single-stack, disk-type rotor-stator combination, the mechanical tolerance problems associated with the previously described motor of the Lyman patent are avoided. Moreover, the disk-type rotor has relatively low inertia so that high speed operation can be achieved, the inertia being capable of even further reduction by using a tapered rotor pole configuration described in more detail below. Further, by making the stator pole piece spacings within each group equal to the spacings of the rotor pole pieces, torque cancellation problems are effectively eliminated and high torques can be achieved. The excitation coils can be positioned on the stator either at a region adjacent the rotor-stator pole gaps or at a position remote therefrom. Moreover, the stator can be fabricated in laminated form to provide the most effective magnetic path with minimal eddy current losses, the laminations being oriented in a direction such that the magnetic forces which are produced during operation have little or no tendency to de-laminate the stator over a prolonged course of time. The laminated stator formation is effectively rigidly mounted to the motor housing so as to provide an accurate alignment of the stator pole faces with a selected reference plane of the housing so that accurate positioning thereof relative to the rotor pole faces is achieved.

In summary, a rotary stepping motor providing high torques and having sufficiently low rotor inertia to operate at high speeds is obtained by utilizing the configuration of the invention. The specific structures of the various embodiments of the stepping motor of the invention are described more easily with reference to the accompanying drawings wherein FIG. 1 is an external end elevation view of an embodiment of the motor of the invention;

Figure 1:
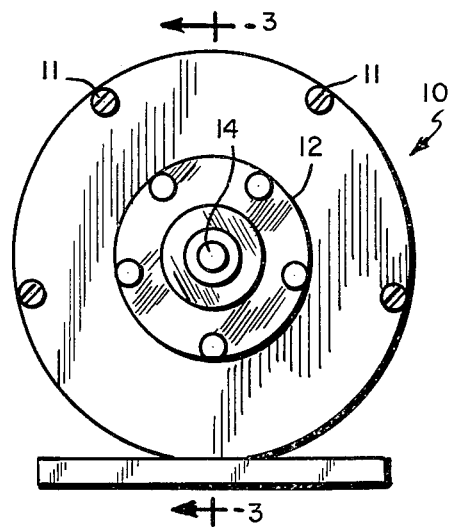
Figure 2:
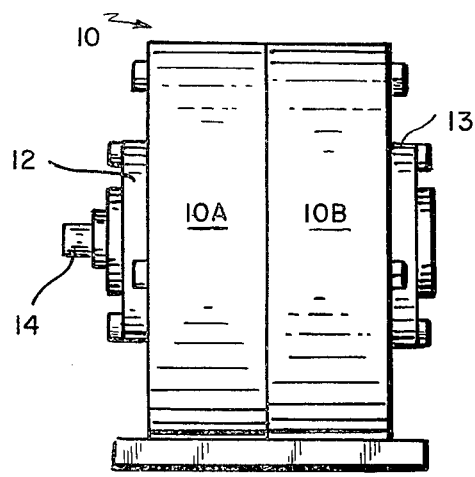
FIG. 2 is an external side elevation view of the motor of FIG. 1.

As can be seen in FIGS. 1-5, the motor of the invention has a housing 10 which is formed by portions 10A and 10B which are suitably held together by a plurality of bolts 11. The housing has end blocks 12 and 13 serving to rotatably mount a shaft 14. An axially fixed bearing assembly 15 is located in end block 12, while an axially floating bearing 16 is located in the opposite end block 13. The axially fixed bearing 15 prevents axial shaft displacement due to end thrusts thereon while the axially floating bearing permits the free end of the shaft to move axially to allow for thermal contraction and expansion, as discussed in the above-referred to U.S. patent of Lyman.

Figure 3:
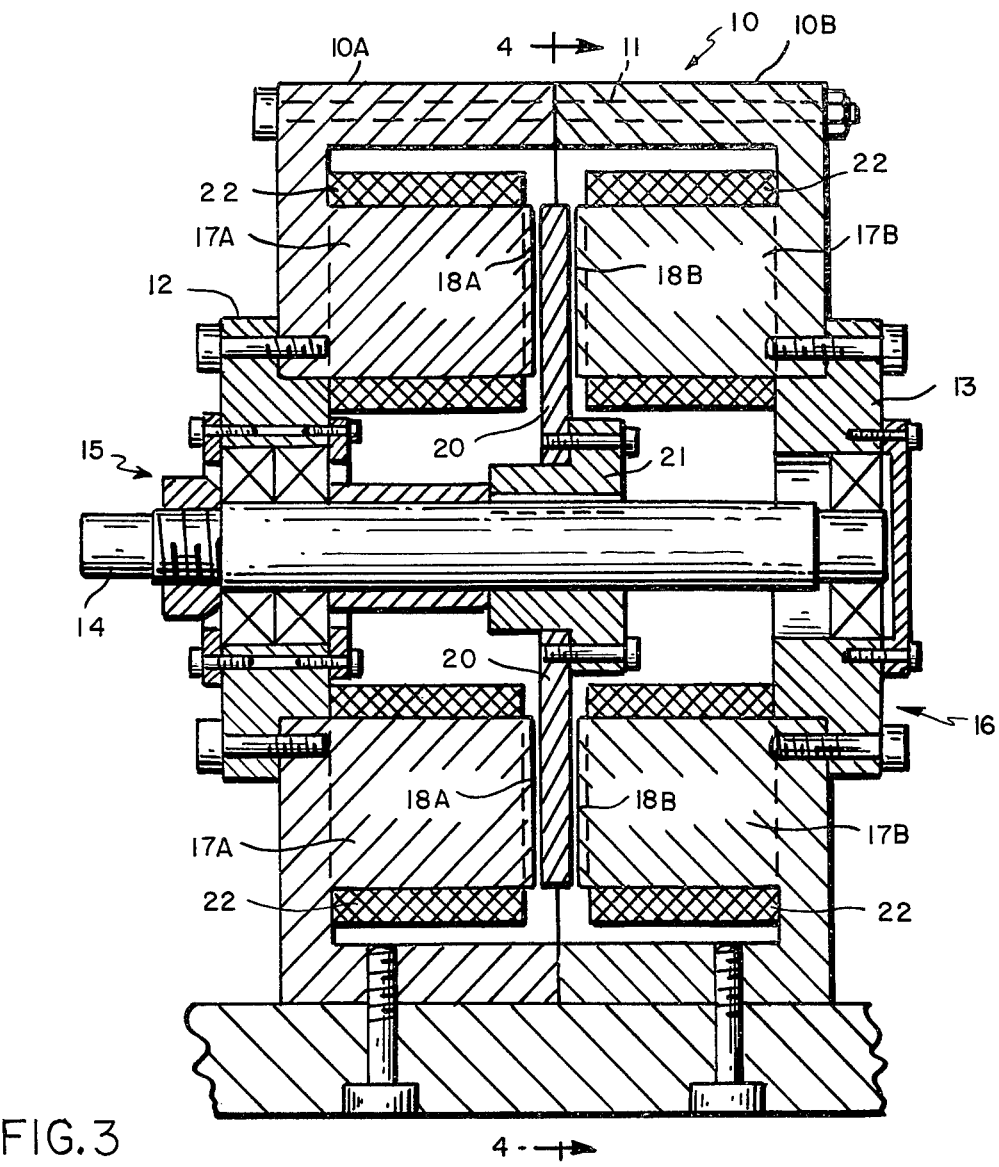
FIG. 3 is a view in section taken along the line 3—3 of FIG. 1.
Figure 4:
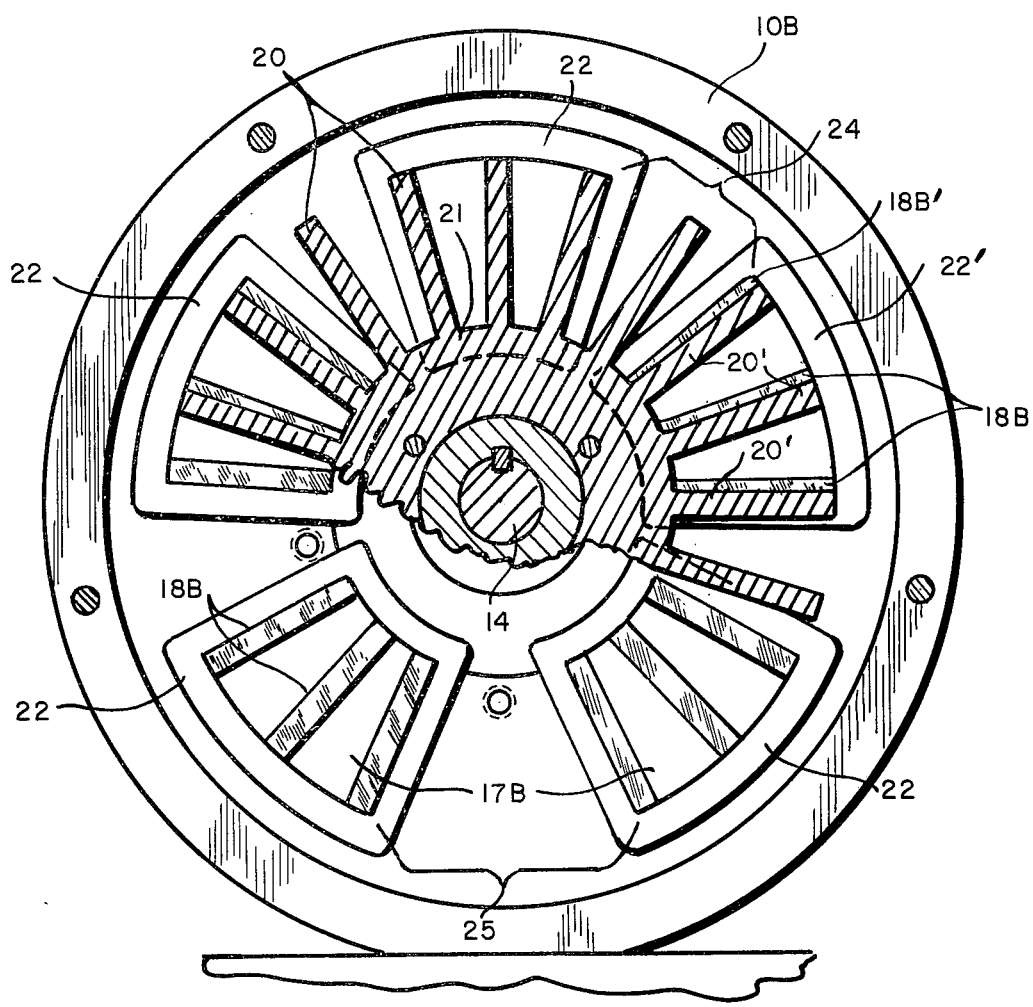
FIG. 4 is a view in section taken along the line 4—4 of FIG. 3 with the lower portion of the rotor shown broken away.
Figure 5:
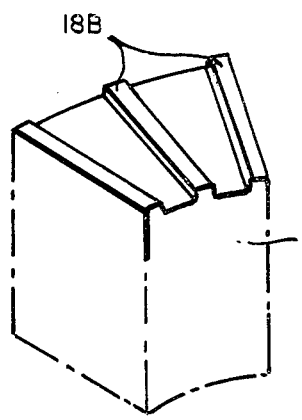
FIG. 5 is a perspective view of a part of the stator showing a portion of one of the stator pole piece groups of the motor of FIG. 1.

The stator comprises a pair of stator elements which may be integrally formed with housing 10 or may be formed separately and fixedly secured to housing 10, as shown by stator elements 17A and 17B in FIGS. 3 and 4. The stators are made of an appropriate magnetic material, such as silicon iron, and have a plurality of stator pole pieces 18A and 18B formed thereon, the faces of the pole pieces 18A of stator element 17A being separated from the corresponding faces of pole pieces 18B of stator element 17B by a gap of sufficient width to permit the passage therebetween of radially extended rotor pole pieces 20, as best shown in FIG. 3. The rotor poles may be affixed to a rotor hub 21, or they may be formed integrally therewith, which hub is then fixedly secured to shaft 14 so as to rotate integrally with the shaft.

As can be best seen in FIG. 4, the rotor poles 20 are equally spaced about the rotor hub 21. The stator poles 18, as exemplified by stator poles 18B in FIG. 4, are constructed so as to form a plurality of groups thereof, each group having an appropriate coil winding 22 associated therewith. In the particular embodiment described with reference to FIGS. 1-5, the motor is arranged for five-phase operation wherein the rotor has twenty equally spaced poles, while the stator has fifteen pole pairs 18A and 18B, the latter being divided into five groups of three pole pairs each, for the five-phase operation. As seen best in FIG. 4, the spacing of the stator poles in each group is uniform and is made equal to the spacing between the rotor poles 20 so that at each step position, during operation, three rotor poles are symmetrically positioned, either in exact alignment with or appropriately spaced between, a corresponding group of three stator poles. In the position shown in FIG. 4 the three rotor poles shown at the top of the drawing are substantially exactly aligned with the stator poles in the group at the top of the drawing.

The spacing between each of the stator pole groups, however, is not equal to the spacing between the rotor poles, so that in such position none of the other rotor poles is aligned with any of the stator poles in any of the remaining groups. For the five-phase operation of the specific embodiment shown herein, the five stator pole groups are separated by four equal spacings exemplified by spacing 24 and one remaining spacing 25 which is greater than spacings 24.

When three rotor pole pieces are aligned with a corresponding group of three stator pole pieces, as shown in FIG. 4, it is clear that maximum magnetic satisfaction occurs therebetween. Accordingly, there is no tendency for torque cancellations as would occur in the prior art configurations wherein unequal numbers of rotor and stator poles are used and wherein only a single pole can be aligned at any one time in a position of maximum magnetic satisfaction, the adjacent poles being oppositely misaligned so as to cause torque cancellations and, hence, an overall torque which is less than that obtained in the structure of FIG. 4.

Figure 7:
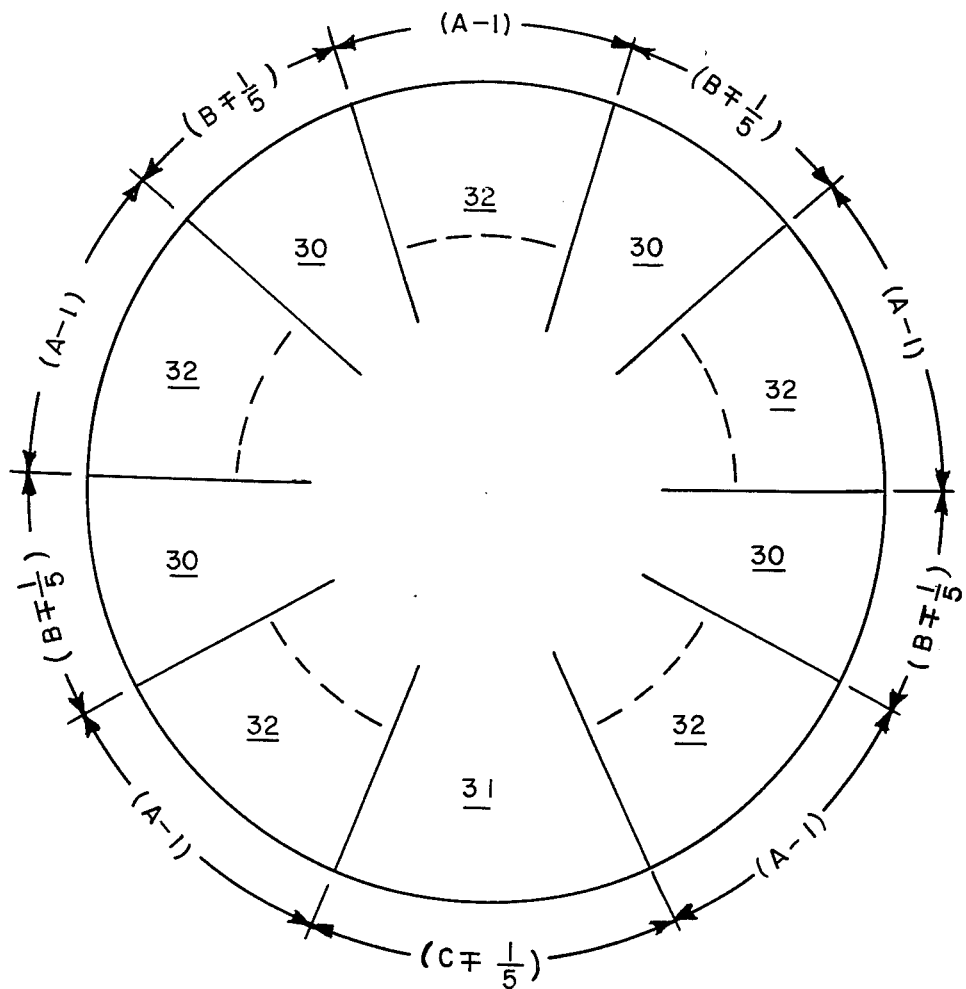
FIG. 7 shows a diagrammatic view of a preferred scheme for selecting the stator group spacings in the motor of the invention.

In selecting the spacings of the stator pole groups the scheme discussed with reference to the diagram shown in FIG. 7 can be used. Thus, for the five-phase operation of FIG. 4, four equal spacings 30 (corresponding to spacings 24 of FIG. 4) and one remaining spacing 31 (corresponding to spacing 25 of FIG. 4) are present between the five stator pole groups 32. If the rotor poles are symmetrically arranged to provide a total of "R" poles and, accordingly, a total of R spaces therebetween, a "unit space" can be defined as the spacing between the rotor poles. Thus, the total number of unit spaces in the rotor, and likewise in the stator, is equal to R. Since the spacings of the stator poles in each group are equal to the spacings between the rotor poles, each of the stator pole groups 32 must occupy (A−1) unit spaces, where A is the number of stator poles in each group. Each of the four equal spaces 30 between the stator pole groups is arranged to occupy (B+⁻1/5) unit spaces and the remaining unequal space 31 is arranged to occupy (C+⁻1/5) unit spaces, where B and C are integers. The total number of unit spaces in the stator for a five-phase motor can, therefore, be set forth as follows:

$$5(A-1) + 4(B+^-1/5) + (C+^-1/5) = R$$

which can be rewritten in the following form:
$$5A + 4B + C = R+^-1$$

Such expression can be more generally written for an N-phase motor operation as:

$$(N)A + (N-1)B+C = R +N-^-1$$

For example, a five-phase step motor having 200 steps per revolution (wherein each step is 1.8°) uses a rotor having 20 equally spaced rotor poles (R=20) arranged to have angular spacings therebetween of 18° (a unit space). For such a configuration the above equation becomes $$5A + 4B + C = 26 \text{ or } 24.$$

If the number of teeth for each stator group is selected as a relatively large number (e.g., A=4), it is found that, since B can then be equal to 1 at most, insufficient space would be available for positioning the coils 22 when such coils are mounted, as shown in FIGS. 3 and 4, on the stator elements 17A and 17B at the regions adjacent the rotor/stator pole gaps with portions thereof positioned between the stator pole groups. If a lesser number of poles is provided in each stator group (e.g., A=3), more space can be provided between the groups for the coil windings and a more appropriate practical configuration can be made in accordance with FIGS. 3 and 4. Thus, in one exemplary embodiment of the invention for five-phase operation the stator is arranged to have 15 pole pairs divided into five groups of three pole pairs each. The stator poles in each group are separated by the same spacing as those of the rotor (i.e., 18°) so that during magnetic satisfaction in an exemplary step position, as shown in FIG. 4, three of the rotor poles are aligned substantially exactly with one of the groups of three stator pole pairs.

Accordingly, if 5A +4B + C is set equal to 26, B and C can be selected so that B×2 and C×3, for example. In such a case the four equal spacings between stator pole groups are equal to (B−1/5) unit spaces (i.e., 32.4°) and the remaining spacing is equal to (C 1/5) unit spaces (i.e., 50.4°).

For such a 200 step motor having 20 rotor poles and five groups of 3 stator poles each, 100 steps can be achieved with a single phase drive, i.e., where only a single coil winding is excited at any particular time. Further, as is well known in the art, 200 steps can be achieved by using multi-phase pulsed excitation wherein three adjacent coil windings are excited simultaneously and alternately with two simultaneously pulsed adjacent coil windings, a coil drive sequence which is conventionally known in the art as a 3-2 drive mode operation.

As can be seen in FIG. 4, the number of unit spaces between each group of stator pole pairs has been selected so that, as the coils 22 are excited in a selected direction about the stator, the rotor rotates in steps in a direction opposite to such selected direction. Thus, when the coil 22 in FIG. 4 at the top of the drawing is excited the stator poles associated therewith are substantially exactly aligned with the rotor poles to provide maximum magnetic satisfaction, as shown in the figure. However, the stator poles 18B' associated with the coil 22' at the right (i.e., in a clockwise direction) of the coil 22 at the top of the drawing are not in exact alignment with the rotor poles 20' nearest thereto. Because the spacing 24 is less than an integral number of unit spaces, the rotor poles are in effect shifted in a clockwise direction with respect to such stator poles. Accordingly, when the coils 22 are excited in a clockwise sequence so that the excitation of coil 22' follows that of topmost coil 22, the rotor poles 20' then become aligned with the stator poles 18B' associated with coil 22'. In order to become so aligned the rotor must rotate in a counter-clockwise direction opposite to the clockwise direction of the sequence of coil excitation.

Figure 6:
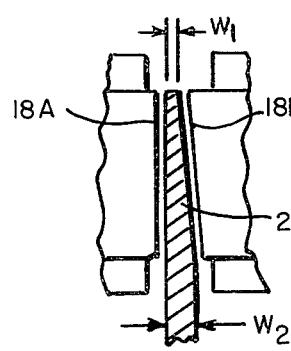
FIGS. 6 and 6a show section views of alternative embodiments of the rotor and stator pole pieces of the motor of the invention.

In order to further enhance the ability of the motor to start from rest and reach and maintain high speed operation, the inertia of the rotor can be further decreased by using rotor poles having a tapered configuration. Since the effect of the inertia is largely felt at the tips of the rotor poles, such effects can be reduced by tapering the rotor in the manner shown in FIGS. 6 and 6a wherein a portion of the rotor pole 20 (shown in section) and its adjacent stator poles 18A and 18B are shown in each instance. As can be seen in FIG. 6, for example, in one embodiment thereof, only the rotor pole face adjacent stator pole 18B is tapered and the latter pole faces of each of such stator poles are correspondingly shaped to maintain a uniform air gap therebetween. In a practical configuration, the rotor may have a finite width, $W_2$, which may be, for example, 0.25 inches and will be tapered to a finite width, $W_1$ at the tip of, for example, 0.1 inches.

Figure 6A:
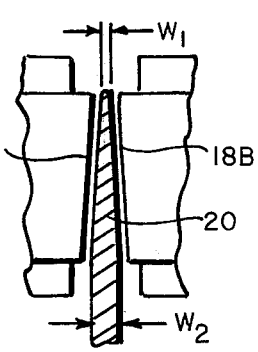

An alternative embodiment of such a tapered configuration is shown in FIG. 6a to provide substantially the same widths $w_1$ and $w_2$. In this case, both rotor pole faces are tapered and the corresponding stator pole faces are shaped accordingly to maintain uniform air gaps therebetween. In addition to reducing the inertia of the rotor, the tapering thereof tends to reduce eddy-current losses which may arise in the rotor structure.

Figure 8:
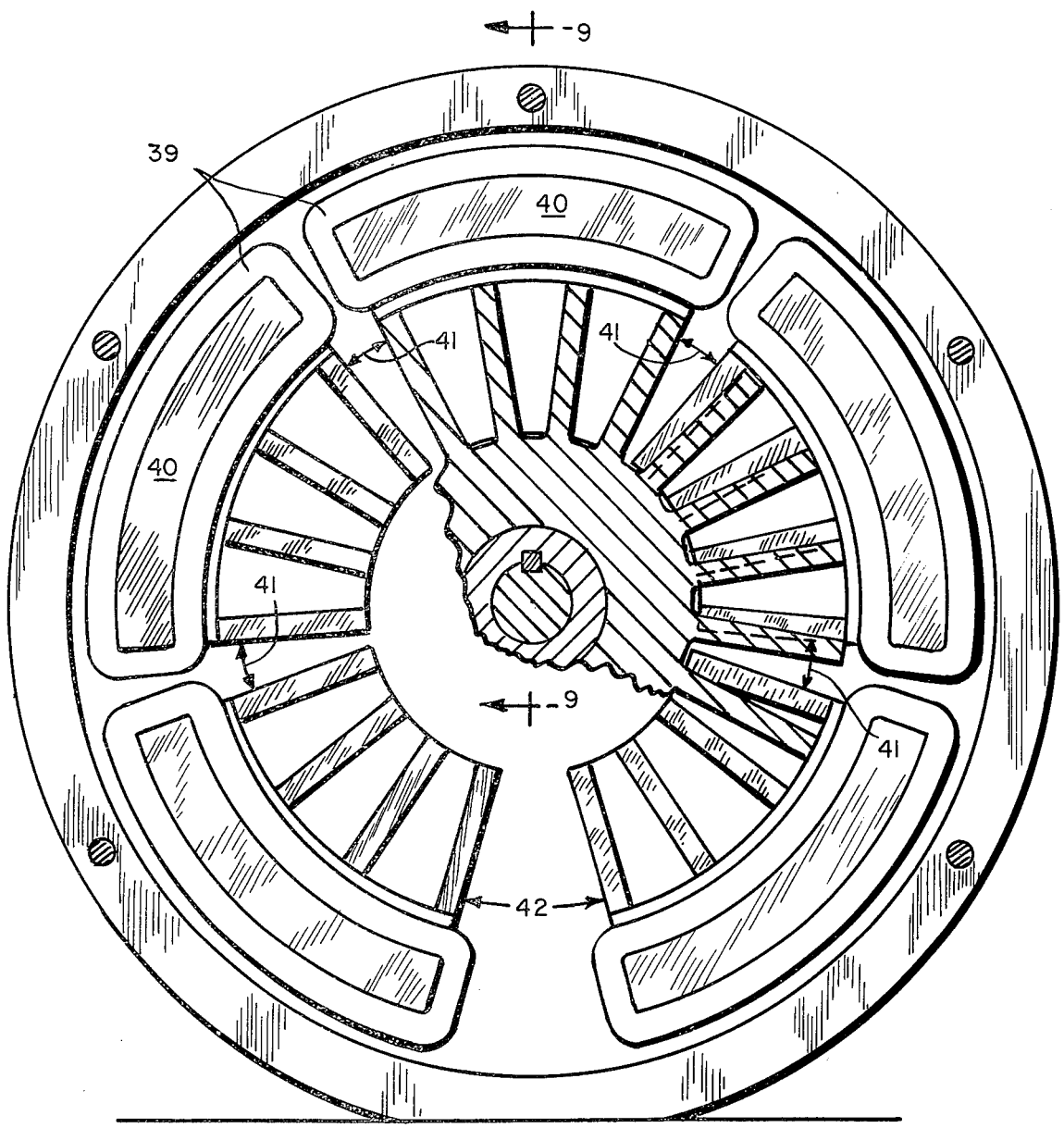
FIG. 8 shows a view partially in section of an alternative embodiment of the stator configuration of the invention.
Figure 9:
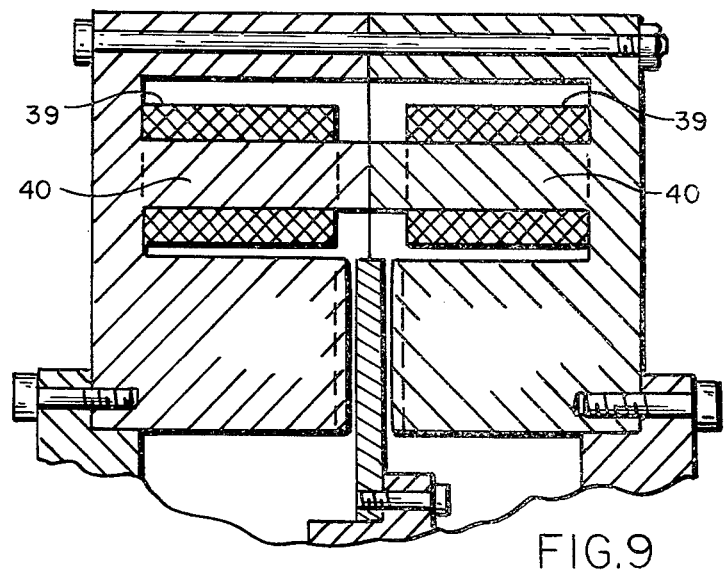
FIG. 9 is a view in section of a portion of the embodiment shown in FIG. 8 taken along the line 9—9 thereof.

An alternative embodiment of the stator configuration of FIGS. 3 and 4 is shown in FIGS. 8 and 9 wherein the excitation coils 39, rather than being positioned so that portions thereof are between each of the stator pole groups, as in FIG. 4, for example, are positioned at regions remote therefrom, i.e., about the stator legs 40, as shown. With the removal of the coils from between each of the stator pole groups, sufficient space is made available so that an additional stator pole can be used in each group. For the particular five-phase configuration shown in FIGS. 8 and 9 five groups of stator poles having four stator poles each are utilized. Such groups have four equal spacings 41 therebetween and one remaining larger spacing 42. None of the spacings 41 or 42 is equal to the rotor spacings, the former spacings in the embodiment shown being less than the spacing between each rotor pole and the remaining spacing 42 being greater than the rotor pole spacing. In the specific embodiment shown in FIGS. 8 and 9 the four equal spacings 41 between the stator pole groups are made equal to less than a unit space, i.e., 14.4° (where B=1), while the spacing 42 is made equal to less than two unit spaces, 32.4°, (where C=2). The use of an additional pole piece in each stator pole group (i.e., A=4) increases the torque that is available as compared to the configuration of FIGS. 3 and 4. As discussed above, when the coils 39 are sequenced in one direction (e.g., a clockwise direction) about the stator, the rotor is caused to rotate in the opposite (i.e., counter-clockwise) direction.

Figure 10:
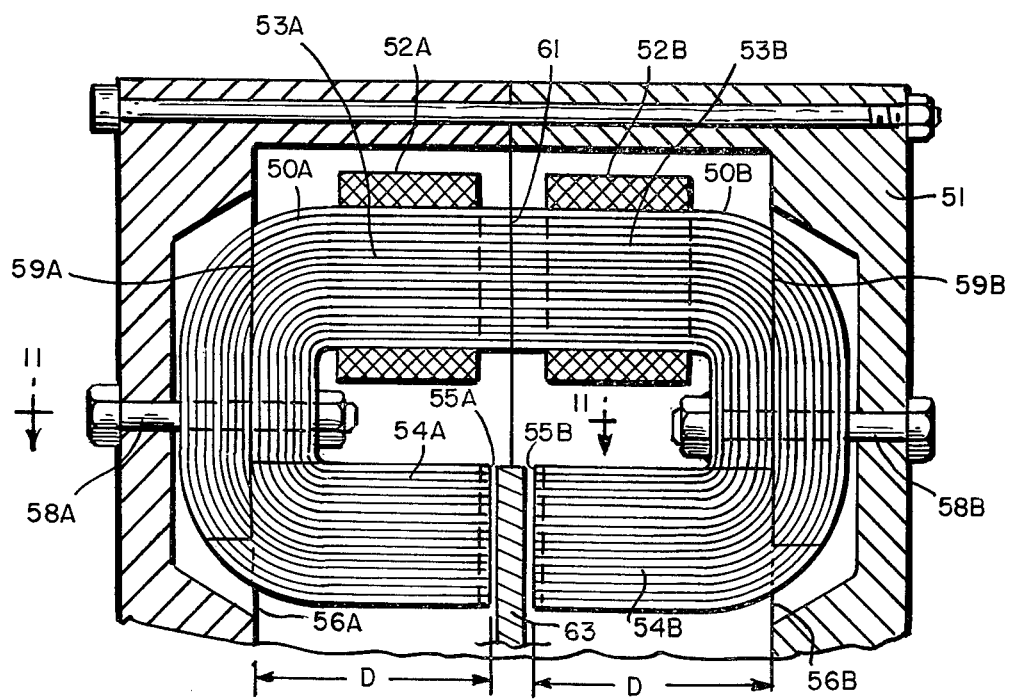
FIG. 10 is a view in section of a portion of an alternative embodiment of the invention using a laminated stator configuration.

In order to increase further the efficiency of the motor operation, a laminated stator structure may be utilized in order to minimize eddy current losses. Various embodiments of such a laminated structure are shown in FIGS. 10 through 18. In FIGS. 10–14, for example, the stator is made up of a plurality of pairs of stator elements 50, one set of which is shown in FIG. 10 as comprising a first stator element 50A and a second stator element 50B. Such elements are effectively U-shaped, laminated structures which can be suitable mounted to a housing 51, as discussed in more detail below. Excitation coils 52A and 52B are shown about leg portions 53A and 53B of the U-shaped elements 50A and 50B. The laminated elements must be maintained in a fixed position during operation so that the pole faces 55A and 55B at the ends of leg portions 54A and 54B are accurately aligned with the rotor poles 63. As shown best in FIGS. 10 and 11, accurate alignment is achieved if the distance "D" between the stator pole faces 55A and 55B and reference planes 56A and 56B, respectively, is held constant. The reference plane can be a reference planar surface of the housing, such as reference surface 57 shown best in FIG. 11. In accordance with one embodiment of the invention shown in FIGS. 10 and 11, the laminated elements 50 are appropriately clamped to the housing at the bight region of the U-shaped elements such as by suitable bolt means 58, such elements each being provided with a cut-away recessed surface 59 which is held in a tightly abutting relationship with a corresponding reference planar surface 57 of the housing. In this way the distance D from the reference planar surface to the plane of the stator pole faces can be fixedly maintained as shown.

Figure 11:
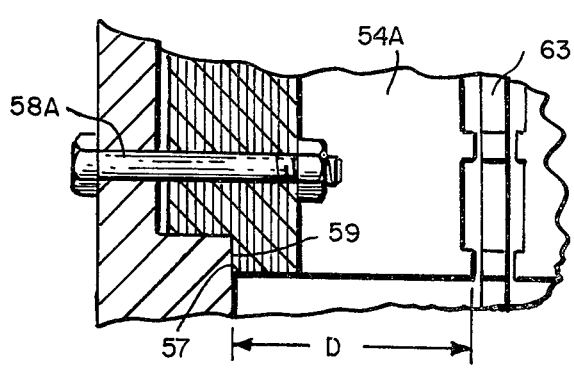
FIG. 11 is a view in section of a portion of the laminated stator structure of FIG. 10 taken along the line 11—11 thereof.
Figure 12:
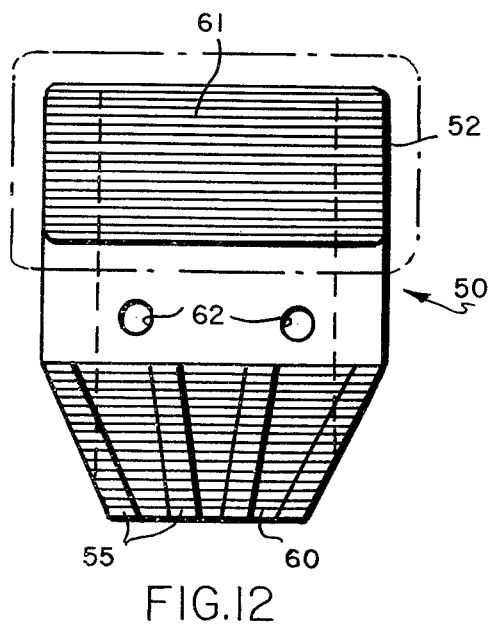
FIG. 12 is a front elevation view of a portion of the stator structure shown in FIG. 10.
Figure 13:
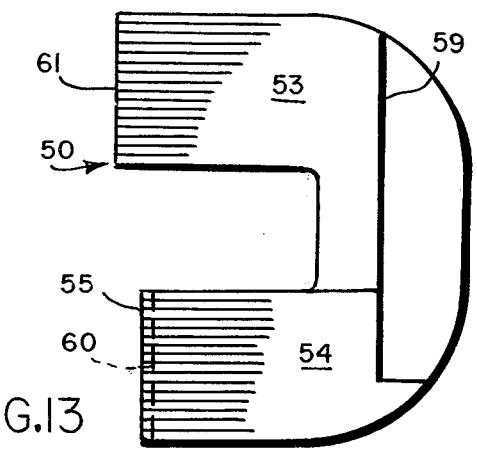
FIG. 13 is a side elevation view of the stator structure shown in FIG. 12.
Figure 14:
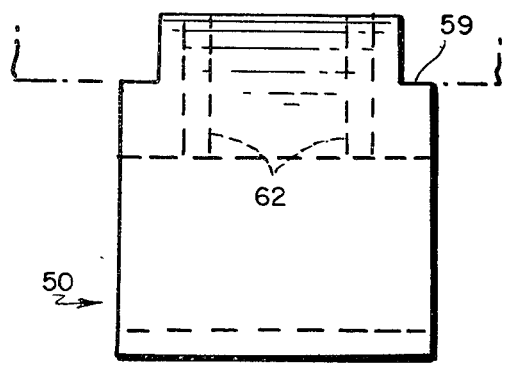
FIG. 14 is a plan view of the stator structure shown in FIG. 12.

The U-shaped laminated stator elements of FIGS. 10 and 11 are shown in more detail in FIGS. 12 through 14 wherein a particular embodiment is machined to provide four stator pole pieces 55 on one surface 60 associated with leg 54 thereof, the other surface 61 associated with leg 53 thereof being used to abut a corresponding surface of the companion U-shaped element, as best shown in FIG. 10. The coil 52 is shown as wound around the upper leg 53 of the U-shaped elements. The recessed surface 59 accordingly abuts the reference planar surface on the housing, as best shown in FIG. 11. In the particular embodiments discussed, a pair of bolts are used to clamp each of the elements to the housing via bolt holes 62.

Figure 15:
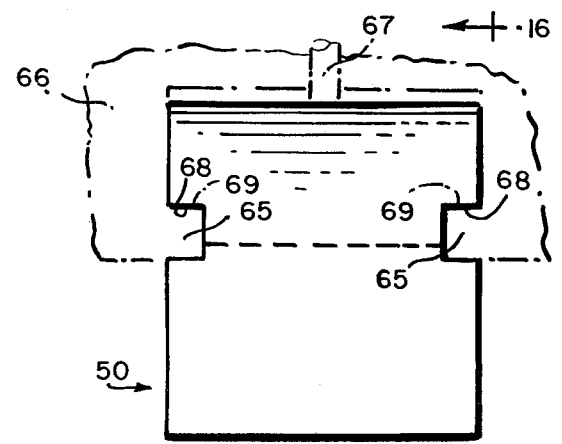
FIG. 15 is a plan view of an alternative embodiment of the stator structure.
Figure 16:
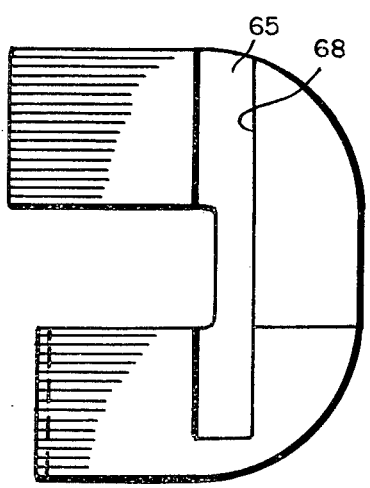
FIG. 16 is a side elevation view of the stator structure shown in FIG. 15.
Figure 17:
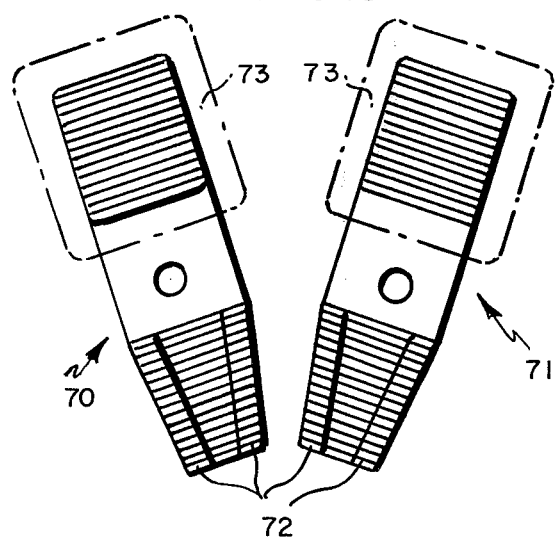
FIG. 17 is a front elevation view of an alternative embodiment of the stator structure of FIG. 10.

An alternate form of clamping the U-shaped elements to the housing is shown in FIGS. 15 and 6 wherein a pair of slots 65 are cut into the element 50 to form an effective T-portion thereof, as shown best in FIG. 15, which T-portion then fits into a correspondingly formed portion 66 of the housing. An appropriate locking screw 67 shown in phantom in FIG. 15 may be used to cause the surfaces 68 of the slotted portions of the element 50 to tightly abut against the corresponding planar surfaces 69 of the housing, the latter surfaces corresponding to the desired reference planar surfaces required to provide an accurate positioning of the stator pole faces of the element 50 as discussed with reference to FIG. 11.

In the embodiments of the laminated stator structure discussed with reference to FIGS. 10 through 16, the coils are shown as wound around the upper leg 53 of the U-shaped element so that such coils are remote from regions between the stator pole groups. Alternatively, such coils may be wound about the legs 54 of the U-shaped elements so that portions of the coil are positioned in the spacings between such stator pole groups in much the same manner as shown with reference to FIG. 4, for example.

A further alternative embodiment of the laminated stator elements is shown in FIG. 18. For example, where groups of four stator pole faces are desired to be formed as in FIG. 12, such groups may each be formed by using a pair of laminated elements 70 and 71 which are mounted adjacent each other to the housing by appropriate bolt or slotted means, as discussed above. Such laminated elements are machined to provide, for example, a group of four stator poles 72, two of such poles being machined on each of the laminated elements which are angularly spaced from each other to provide the appropriately desired spacings between such poles. The coils 73 may be formed as two separate coils electrically connected in series, as depicted in FIG. 18, each of which is wound around a corresponding upper leg of U-shaped elements 70 and 71. Alternatively, a single coil may be wound so as to encircle both upper legs of the laminated elements 70 and 71, if desired.

Although the invention is described specifically with respect to the various embodiments depicted in FIGS. 1 through 18, modifications thereof will occur to those skilled in the art within the spirit and scope of the invention. Hence, the invention is not to be construed as limited to the particular embodiments shown and described herein except as defined by the appended claims.

What is claimed is:

1. A multiphase rotary stepping motor comprising
housing means;
a shaft;
bearing means associated with said housing means for rotatably mounting said shaft;
a rotor secured to said shaft, said rotor having a plurality of equally spaced pole pieces extending radially therefrom;
a stator fixedly mounted to said housing means, said stator having N groups of pairs of pole pieces separated by gaps, said rotor pole pieces being rotatably movable through said gaps, each of said groups having at least one coil associated therewith so that corresponding groups of said rotor pole pieces are capable of developing flux paths with said groups of stator pole pieces upon passage of current in the coils of said stator pole piece groups;
the stator pole pieces in each of said groups thereof being angularly spaced from each other by a spacing equal to the spacing of said rotor pole pieces and said stator pole groups being separated from each other by N spacings that are not equal to the spacings of said rotor pole pieces, (N−1) of said N spacings being equal to each other and the remaining one of said N spacings being greater than that of said (N−1) spacings.

2. A multiphase rotary stepping motor in accordance with claim 1 wherein portions of said coils are positioned in the spacings between said stator pole groups.

3. A multiphase rotary stepping motor in accordance with claim 1 wherein said coils are positioned at regions remote from the spacings between said stator pole groups.

4. A multiphase rotary stepping motor in accordance with claim 1 wherein said stator is laminated.

5. A multiphase rotary stepping motor in accordance with claim 4 wherein said laminations are oriented to form laminar planes at said gaps which are substantially perpendicular to the plane of rotation of said rotor pole pieces to prevent delamination thereof by the magnetic forces present during operation of said motor.

6. A multiphase rotary stepping motor in accordance with claim 4 wherein each of said groups of pairs of stator pole pieces includes at least one laminated stator element having a surface on which said stator pole pieces are formed;
said stator further including
means for mounting said laminated stator elements to said housing so that the pole pieces formed on each of said elements are at a preselected position relative to a reference planar surface of said housing.

7. A multiphase rotary stepping motor in accordance with claim 6 wherein each of said laminated stator elements has one planar surface which is spaced from the surface on which said pole pieces are formed, and
said mounting means includes means for affixing said laminated stator elements to said housing so that said planar surface thereof is maintained in a tightly abutting relationship to said reference planar surface of said housing;
whereby the faces of the stator pole pieces formed on said elements are maintained at a fixed position relative to said reference planar surface.

8. A multiphase rotary stepping motor in accordance with claim 7 wherein said affixing means comprises bolt means for clamping said element to said housing.

9. A multiphase rotary stepping motor in accordance with claim 8 wherein said elements are U-shaped and said bolt means clamps said element to said housing at the bight region thereof.

10. A multiphase rotary stepping motor in accordance with claim 7 wherein said affixing means includes
a plurality of slots formed in said housing at the regions thereof where said elements are to be affixed, each of said laminated stator elements having a correspondingly shaped configuration for engagement with its associated slot to retain said elements at preselected positions in said housing.

11. A multiphase rotary stepping motor in accordance with claim 10 and further including means for locking each of said laminated stator elements in said retained positions.

12. A multiphase rotary stepping motor in accordance with claim 1 wherein
said coils are adapted for sequential excitation in a selected direction about said stator; and
the arrangement of said N spacings between each of said stator pole groups being such that as said coils are sequentially excited said rotor rotates in a direction opposite to said selected direction.

13. A multiphase rotary stepping motor in accordance with claim 1 wherein the total number of stator pole pairs is less than the total number of rotor poles and the spacings between said stator pole groups are greater than the spacings between said rotor poles.

14. A multiphase rotary stepping motor in accordance with claim 1 wherein the total number of stator poles is equal to the number of rotor poles, said (N−1) spacings between said stator pole groups being less than the spacing between said rotor poles and said remaining one of said N spacings between said stator pole groups being greater than the spacing between said rotor poles.

15. A multiphase rotary stepping motor in accordance with claim 1 wherein
said rotor has R uniformly spaced pole pieces, the spacing between each of said rotor poles being defined as a unit space,
each of said groups of stator pole pairs has A stator pole pieces, said (N−1) equal spacings between said stator pole groups being equal to (B+⁻1/N) where B is an integral number of said unit spaces, and said remaining one of said N spacings being equal to (C+⁻1/N) where C is an integral number of said unit spaces, the quantities A, B and C being selected in accordance with the following relationship:

$$(N)A + (N-1)B + C = R + N-^1 1$$

16. A multiphase rotary stepping motor in accordance with claim 15 wherein N is equal to 5.

17. A multiphase rotary stepping motor in accordance with claim 16 wherein
said rotor comprises twenty pole pieces angularly and uniformly spaced from each other by 18°; and
said stator comprises fifteen pairs of pole pieces formed as five groups thereof, each group having three pairs of poles angularly spaced from each other by 18°, said groups being angularly spaced from each other by five spacings, four of which are equal to 32.4° and the remaining one of which is equal to 50.4°.

18. A multiphase rotary stepping motor in accordance with claim 16 wherein
said rotor comprises twenty pole pieces angularly and uniformly spaced from each other by 18°; and
said stator comprises twenty pairs of pole pieces formed as five groups thereof, each group having four pairs of poles angularly spaced from each other by 18°, said groups being angularly spaced from each other by five spacings, four of which are equal to 14.4° and the remaining one of which is equal to 32.4°.

19. A multiphase rotary stepping motor in accordance with claim 1, wherein at least one pole face of each of said rotor pole pieces is tapered in a direction to provide a reduced mass at the tips thereof and each corresponding pole face of said stator pole pieces is shaped to provide a uniform gap between said tapered faces of said rotor pole piece and the said corresponding faces of said stator pole pieces.

20. A multiphase rotary stepping motor in accordance with claim 19, wherein said taper is applied to only one face of each of said rotor pole pieces.

21. A multiphase rotary stepping motor in accordance with claim 19 wherein said taper is applied to both pole faces of each of said rotor pole pieces.

* * * * *